Oct. 23, 1962 J. L. JENSEN 3,060,363
SEMI-CONDUCTOR APPARATUS
Filed Dec. 23, 1957 4 Sheets-Sheet 1

INVENTOR.
JAMES LEE JENSEN
BY Omund R. Dahle
ATTORNEY

MODE

| | | I | II | III | IV | V | VI |
|---|---|---|---|---|---|---|---|
| Voltages Appearing On Transformer Primary Windings | N1 | +1.0 | +0.5 | -0.5 | -1.0 | -0.5 | +0.5 |
| | N2 | -1.0 | -0.5 | +0.5 | +1.0 | +0.5 | -0.5 |
| | N3 | -0.5 | +0.5 | +1.0 | +0.5 | -0.5 | -1.0 |
| | N4 | +0.5 | -0.5 | -1.0 | -0.5 | +0.5 | +1.0 |
| | N5 | -0.5 | -1.0 | -0.5 | +0.5 | +1.0 | +0.5 |
| | N6 | +0.5 | +1.0 | +0.5 | -0.5 | -1.0 | -0.5 |
| Voltages Appearing On Transformer Feedback Windings | N7 | +1.0 | +0.5 | -0.5 | -1.0 | -0.5 | +0.5 |
| | N8 | -1.0 | -0.5 | +0.5 | +1.0 | +0.5 | -0.5 |
| | N9 | -0.5 | +0.5 | +1.0 | +0.5 | -0.5 | -1.0 |
| | N10 | +0.5 | -0.5 | -1.0 | -0.5 | +0.5 | +1.0 |
| | N11 | -0.5 | -1.0 | -0.5 | +0.5 | +1.0 | +0.5 |
| | N12 | +0.5 | +1.0 | +0.5 | -0.5 | -1.0 | -0.5 |
| Voltages Appearing On Third-Harmonic Transformer | N13 N15 | +1.0 | -1.0 | +1.0 | -1.0 | +1.0 | -1.0 |
| | N14 N16 | -1.0 | +1.0 | -1.0 | +1.0 | -1.0 | +1.0 |
| Bias Voltages On Transistor Switches | N15 + N7 - 1.0 | +1.0 | -1.5 | -0.5 | -3.0 | -0.5 | -1.5 |
| | N16 + N8 - 1.0 | -3.0 | -0.5 | -1.5 | +1.0 | -1.5 | -0.5 |
| | N15 + N9 - 1.0 | -0.5 | -1.5 | +1.0 | -1.5 | -0.5 | -3.0 |
| | N16 + N10 - 1.0 | -1.5 | -0.5 | -3.0 | -0.5 | -1.5 | +1.0 |
| | N15 + N11 - 1.0 | -0.5 | -3.0 | -0.5 | -1.5 | +1.0 | -1.5 |
| | N16 + N12 - 1.0 | -1.5 | +1.0 | -1.5 | -0.5 | -3.0 | -0.5 |

FIG. 2

INVENTOR.
JAMES LEE JENSEN
BY Omund R. Dahle
ATTORNEY

Oct. 23, 1962 J. L. JENSEN 3,060,363

SEMI-CONDUCTOR APPARATUS

Filed Dec. 23, 1957 4 Sheets-Sheet 3

INVENTOR.
JAMES LEE JENSEN
BY Osmund R. Dahle
ATTORNEY

INVENTOR.
JAMES LEE JENSEN
BY Omund R. Dahle
ATTORNEY

United States Patent Office 3,060,363

Patented Oct. 23, 1962

3,060,363
SEMI-CONDUCTOR APPARATUS

James Lee Jensen, St. Louis Park, Minn., assignor to Minneapolis-Honeywell Regulator Company, Minneapolis, Minn., a corporation of Delaware Filed Dec. 23, 1957, Ser. No. 704,713
18 Claims. (Cl. 321—5)

This invention relates to transistor circuit apparatus capable of converting and producing three phase alternating current power from a low voltage direct current source. More specifically, this invention relates to three phase transistor inverter circuit apparatus having a phase separation circuit to produce three alternating type signals which are displaced one third of a cycle from the other.

An object of this invention is to provide transistor inverter circuits magnetically interconnected to provide three phase alternating current power from a direct current source.

Another object of this invention is to provide three transistor oscillator circuits which are interconnected by phase separation circuits to produce an alternating current three phase output from a D.C. source.

These and other objects of the present invention will become more apparent upon further consideration of the specification, claims, and drawing of which:

FIGURE 2 is a table of potentials appearing at various points of the circuit of FIGURE 1 during each mode of operation;

Figure 1:
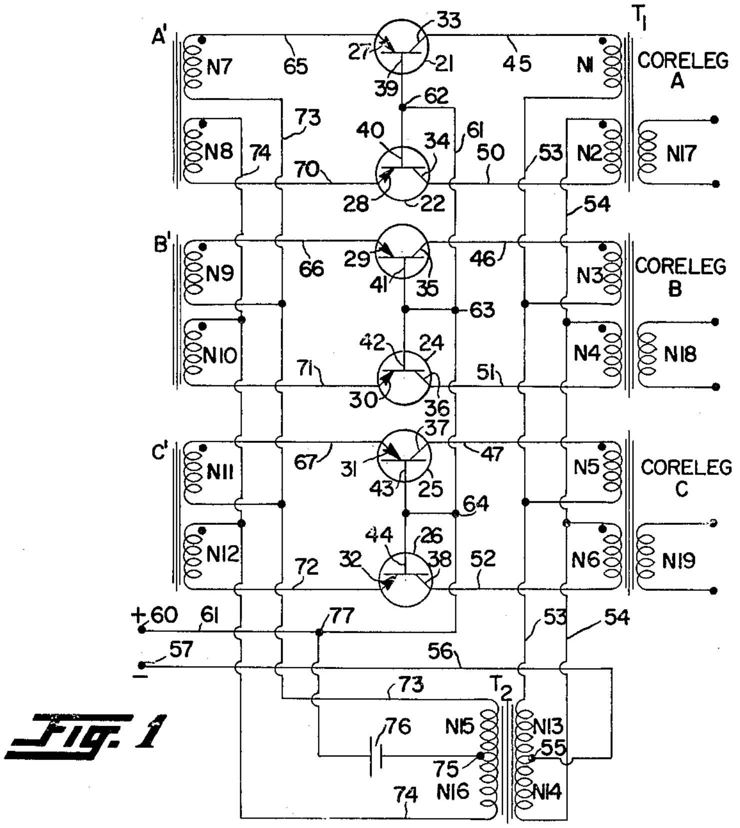
FIGURE 1 is a schematic diagram of one modification of the invention.

Referring now to FIGURE 1, there is disclosed a three phase transformer T1 which has core legs A, B, and C. Core leg A has primary windings N1 and N2, core leg B has primary windings N3 and N4, core leg C has primary windings N5 and N6. In addition, core leg A has secondary windings N7 and N8, core leg B has secondary feedback windings N9 and N10, and core leg C has feedback secondary windings N11 and N12. Each of the core legs A, B, and C also has an output winding. There is disclosed also a third harmonic transformer T2 which has primary windings N13 and N14, and which has secondary windings N15 and N16. The core leg shown as A′, with which the feedback secondary windings N7 and N8 are associated is disclosed as being the same core leg as core leg A. Core leg A′ need not necessarily be the same core, and may be if desired a separate feedback transformer which has its primary winding connected to the output of transformer core leg A.

A number of transistor switches are disclosed in FIGURE 1, these being numbered 21, 22, 23, 24, 25 and 26. The transistors are disclosed as PNP junction type transistors; however, the invention is not limited to the use of this type transistor. The transistors 21, 22, 23, 24, 25 and 26 have emitter electrodes 27, 28, 29, 30, 31 and 32, respectively, collector electrodes 33, 34, 35, 36, 37 and 38, respectively, and have base electrodes 39, 40, 41, 42, 43 and 44, respectively. These transistors are operated as switching devices as will be hereafter described.

Referring again to the windings of the transformer T1, the windings N1 through N12 have the beginning of each of the windings denoted by the use of a solid dot adjacent thereto. The beginning terminal and winding N1 is connected by a conductor 45 to the collector electrodes 33 of transistor 21. The beginning terminals of windings N3 and N5 are connected, respectively, to the collector electrodes 35 and 37 by conductors 46 and 47. The ending terminal of winding N2 is connected by a conductor 50 to the collector electrode 34 of transistor 22. Similarly, the ending terminals of windings N4 and N6 are connected by conductors 51 and 52 to the collector electrodes 36 and 38, respectively, of transistors 24 and 26. The ending terminals of windings N1, N3 and N5 are directly connected to a conductor 53, which conductor terminates at the upper terminal of winding N13 of transformer T2. The beginning terminals of windings N2, N4 and N6 are directly connected to a conductor 54, which conductor terminates at the lower terminal of winding N14 of transformer T2. The other terminals of windings N13 and N14 are connected together at a junction 55 which is directly connected by a conductor 56 to a negative supply terminal 57.

A positive supply terminal 60 has connected thereto a positive supply conductor 61. The base electrodes 39 and 40 of transistors 21 and 22 are directly connected to the positive supply conductor 61 at a junction 62. The base electrodes 41 and 42 of transistors 23 and 24, respectively, are directly connected to the positive supply conductor 61 at a junction 63. The base electrodes 43 and 44 of the transistors 25 and 26 are directly connected to the positive supply conductor 61 at a junction 64.

The beginning terminals of windings N7, N9 and N11 are connected by conductors 65, 66, and 67 to the emitter electrodes 27, 29 and 31 of transistors 39, 41 and 43, respectively. The ending terminals of windings N8, N10 and N12 are connected by conductors 70, 71 and 72 to the emitter electrodes 28, 30, and 32, respectively, of transistors 22, 24, and 26. The ending terminals of windings N7, N9 and N11 are directly connected to a conductor 73 which terminates at the upper terminal of winding N15 of transformer T2. The beginning terminals of windings N8, N10 and N12 are directly connected to a conductor 74 which terminates at the lower terminal of winding N16 of transformer T2. The other terminals of windings N15 and N16 are connected together at a junction 75. A D.C. bias potential source 76 interconnects the junction 75 with the positive supply conductor 61 at a junction 77 located thereon.

OPERATION OF FIGURE 1

Figure 4:
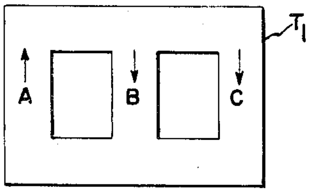
FIGURE 4 shows in a diagrammatic form one type of suitable three phase transformer core for use in the circuit of FIGURE 1.

In considering the operation of the circuit of FIGURE 1, it will be noted that the core legs A, B, and C are the legs of a three phase transformer core, such as is shown diagrammatically in FIGURE 4. In the explanation to follow it will be assumed that flux induced in one leg will divide and flow equally through the remaining two legs. Each of the six transistors operates as a switch and conducts during one-sixth of the total cycle and by proper control of the sequencing of the transistors the currents flowing through the various primary windings of transformer T1 generate a rotating field in the transformer which results in the three phase A.C. output.

The transistor three phase oscillator disclosed in FIGURE 1 operates in six separate modes, which modes follow each other in a predetermined sequence. Let it be assumed, for the purpose of explanation, that the transistors conduct in the following order: transistor 21, transistor 26, transistor 23, transistor 22, transistor 25, and transistor 24, whereafter the cycle repeats. The transistors in this circuit are preferably operated as switches, that is, either fully conductive or cut off.

Let us consider now the first mode of operation in which transistor 21 is conductive. It will be noted that the transistors are disclosed as being connected in the common base configuration but the circuit is not limited to this configuration. A current path may be traced during mode 1 from the positive D.C. supply terminal 60 through the conductor 61 to the base electrode 39 of the transistor 21, through the transistor to the collector electrode 33, the conductor 45, the primary winding N1, through conductor 53, feedback transformer primary winding N13 to junction 55, and through the conductor 56 to the negative supply terminal 57. An emitter current path for the transistor 21 may be traced from the positive supply conductor 61 to junction 77, through bias battery 76 to junction 75, winding N15 of transformer T2, conductor 73, winding N7, conductor 65, through the transistor 21 from emitter to base to junction 62 on the conductor 61 thus completing the current path. The current flowing in the primary winding N1 induces a flux in the core leg A which divides and flows equally through the core legs B and C thereby closing the magnetic path back to core leg A.

If we assume, for ease of explanation, that the windings N1 through N12 have a 1 to 1 ratio, then the relative voltage magnitudes induced on each of these windings is shown in the table of FIGURE 2 under the column Mode I. The voltage shown for windings N1 to N6 are the potentials induced on each winding with respect to the negative source 57. The numbers listed after the windings N1 to N6 are intended to show relative magnitudes and instantaneous polarities of the potentials generated on these windings with respect to negative terminal 57, and while making these comparisons it should be assumed that the primary windings N13 and N14 of transformer T2 are temporarily shorted out. The potentials induced on the windings associated with core legs B and C during Mode I are one-half the magnitude of the potential induced on the windings associated with core leg A. This is to be expected since the rate of change of flux in core leg A is twice that of the flux in either core leg C or core leg B. The relative magnitudes and instantaneous polarities of voltages shown for windings N7 through N12 are measured with respect to the positive source terminal 60. Again for this comparison it is desirable to temporarily neglect the potential of bias source 76 and the induced potentials on windings N15 and N16.

Now considering the potentials appearing on the windings of triple harmonic transformer T2 during Mode I, the potentials generated across windings N13 and N14 are shown with respect to the negative supply terminal 57, and the potentials on windings N15 and N16 are with respect to the positive terminal 60 neglecting, however, the potential of the bias source 76. The last six numbers in the column under Mode I represent the bias potential between emitter and base, respectively, of each of the transistors 21 through 26. These relative magnitudes of bias potentials are based upon use of a one volt bias battery 76. It will be recognized that the relative magnitudes of potentials shown are for explanatory purposes and are not necessarily intended to represent optimum values. The actual voltages which will be generated are effected by the turns ratio of the windings.

In considering these bias potentials it will be seen that during Mode I, only the summation of windings $$N15+N7-1.0$$

which is the bias to transistor 21, satisfies the condition to make the transistor conductive. The other five bias potentials are in a direction to maintain their respective transistors cut off. The first mode of operation continues until such time as the core of triple harmonic feedback transformer T2 approaches saturation. If the feedback transformers shown as cores A′, B′ and C′ which carry the windings N7 to N12 are separate cores rather than cores A, B and C, the saturation above described need not occur in the triple harmonic transformer but may occur in the feedback transformers. At this point it should again be noted that the feedback transformer T2 operates at a frequency which is the third harmonic of the fundamental frequency output of transformer T1. For this reason one-half cycle of the operation of the transformer T2 is equal to one-sixth cycle of operation of the transformer T1.

With the core of transformer T2 becoming saturated, the bias potentials induced on the secondary windings N15 and N16 drops to zero. The bias potential to transistor 21 is now reduced to zero and the transistor 21 becomes non-conductive tending to cut off the current flowing through windings N1 and N13. The flux field in transformer T2 now begins to collapse and the instantaneous polarities induced on windings 15 and 16 are reversed from that which appeared during Mode I. This reversal in polarity of the potential on winding 16 when added to the potential induced on winding N12 is effective to render transistor 26 conductive. As transistor 26 becomes fully conductive Mode II of operation comes into consideration. A current path may now be traced from the positive supply terminal 60 through conductor 61 to junction 64, to base electrode 44 of transistor 26 to collector electrode 38, conductor 52, primary winding N6, conductor 54, winding N14, of third harmonic transformer T2, and through conductor 56 to the negative source terminal 57. An emitter current path for the transistor 26 may be traced from the positive supply conductor 61 to junction 77, and through the bias battery 76 to junction 75, winding N16 of third harmonic transformer T2, conductor 74, winding N12, conductor 72, through the transistor from emitter 32 to base electrode 44, to junction 64 on the positive supply conductor 61 thus completing the circuit.

The collector current flowing through the winding N6 induces a flux in core leg C which divides equally and flows through core legs A and B. During this mode of operation the potentials appearing across the windings N5, N6, N11 and N12 and output winding N19 will have twice the magnitude of the potentials induced on the windings associated with the other two core legs A and B. These relative magnitudes are shown in FIGURE 2 under the column of Mode II.

The current flowing through winding N14 during this mode of operation is effective to maintain the potentials across N15 and N16 such that conductor 74 is positive with respect to conductor 73. During this second mode of operation the negative potential on winding N15 assures that transistors 21, 23, and 25 will remain cut off. The potential on winding N16 is in a direction to aid either of transistors 22, 24 or 26 to conduct, however, the potentials on windings N8 and N10 oppose the potential on N16 so that these transistors remain cut off. These biasing potentials are clearly shown in the table of FIGURE 2. Mode II of operation continues during the second sixth of the cycle of the fundamental frequency until the core of triple harmonic feedback transformer T2 saturates in the opposite direction.

Upon saturation being reached at the end of Mode II, the potentials on windings N15 and N16 drop substantially to zero and the bias on transistor 26 is reduced so that this transistor begins to become non-conductive. The subsequent reduction in current flowing through winding N6 and N14 causes the flux field in the core of third harmonic transformer T2 to begin to collapse whereupon the polarities induced in the secondary windings N15 and N6 again reverse so that conductor 73 becomes positive with respect to conductor 74. During the Mode II period the winding N9 had a plus .5 volt induced thereon and this potential summed together with the new potential on winding N15 is effective to render transistor 23 conductive.

With the transistor 23 becoming conductive Mode III of operation begins and a current path can be traced from the positive supply terminal 60 through conductor 61 to junction 63, through the transistor 23 from base electrode 41 to collector electrode 35, through conductor 46, winding N3, conductor 53, through winding N13 to junction 55 and back through conductor 56 to the negative supply terminal 57. An emitter current path can be traced for transistor 23 from the winding N9 through conductor 66, from emitter 29 to base 41 of transistor 23 through conductor 61 to junction 77, through bias supply 76, winding N15, and conductor 73 to the other terminal of winding N9. The current now flowing through winding N3 causes a flux to be induced in core leg B which divides and flows equally through core legs A and C. The potentials appearing on windings N3, N4, N9, N10 and output winding N18 will have twice the relative magnitude of the potentials induced on the windings associated with core legs A and C. These potentials are shown in the table of FIGURE 2 under the column Mode III. It will be noted that during this mode of operation the negative potential on winding N16 is effective to maintain transistors 22, 24 and 26 cut off. The negative induced potentials on windings N7 and N11 are effective to maintain transistors 21 and 25 cut off so that only transistor 23 has a bias which allows it to conduct.

Mode III continues until the core of third harmonic transformer T2 again saturates, whereupon the transistor 23 is rendered non-conductive, the potential on windings N15 and N16 again reverses so that conductor 74 is positive with respect to conductor 73 and transistor 22 is rendered conductive. Mode IV now commences and a current path may now be traced from the positive supply terminal 60 through the conductor 61 to junction 62, through the transistors from base electrode 40 to collector electrode 34, through conductor 50, winding N2, conductor 54, winding N14 to junction 55, and through conductor 56 to the negative supply terminal 57. The current flowing through transistor 40 and winding N2 induces a flux in the core leg A which is in the opposite direction to that which was induced thereon during Mode I when transistor 21 was conductive and the current path was through winding N1. Consequently, the fluxes flowing through core legs B and C are also flowing in the opposite direction from that during Mode I. This is also reflected in the instantaneous polarity of the potentials on the windings, for example, in considering the potentials on winding N6 as shown in FIGURE 2, during Mode I the potential is +.5 volt and during Mode IV of operation the potential induced on winding N6 is —.5 volt.

Modes V and VI follow Mode IV in a manner similar to that which has been explained for the previous modes of operation. Upon the termination of Mode VI, transistor 21 again is rendered conductive and the cycle repeats.

Figure 3:
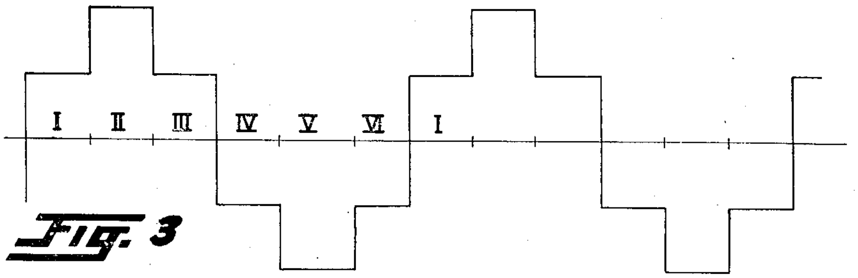
FIGURE 3 shows the wave shape of one phase of the output wave form of the three phase circuit.

FIGURE 3 shows an approximation of the wave form of one of the phases of the three-phase output potential. This wave form may be for example, the wave form on output winding N19. The relative magnitudes of the voltage wave form can be compared with the potential on winding N6 during the six modes of operation. FIGURE 2 shows that the relative potentials on N6 progress during the six modes in the following manner: +.5, +1.0, +.5, —.5, —1.0, —.5. The stepped voltages on the wave form of FIGURE 3 follow the same pattern. The output wave form on the other two output windings N17 and N18 will be of the same wave shape but will be displaced one-third of a cycle from each other and from the voltage on winding N19.

A change in turns ratio of the triple harmonic feedback transformer T2 may be made to eliminate the bias battery 76. If the magnitude of the potentials on the windings N15 and N16 is made one-half of the magnitude of the fundamental harmonic feedback in the windings N7 through N12 the bias battery may be eliminated. Although the invention has been described as operating to provide a step output as shown in FIGURE 3, the invention is not limited to this particular mode of operation and modification of the output wave form can readily be obtained by minor changes in the circuit.

FIGURE 5

Figure 5:
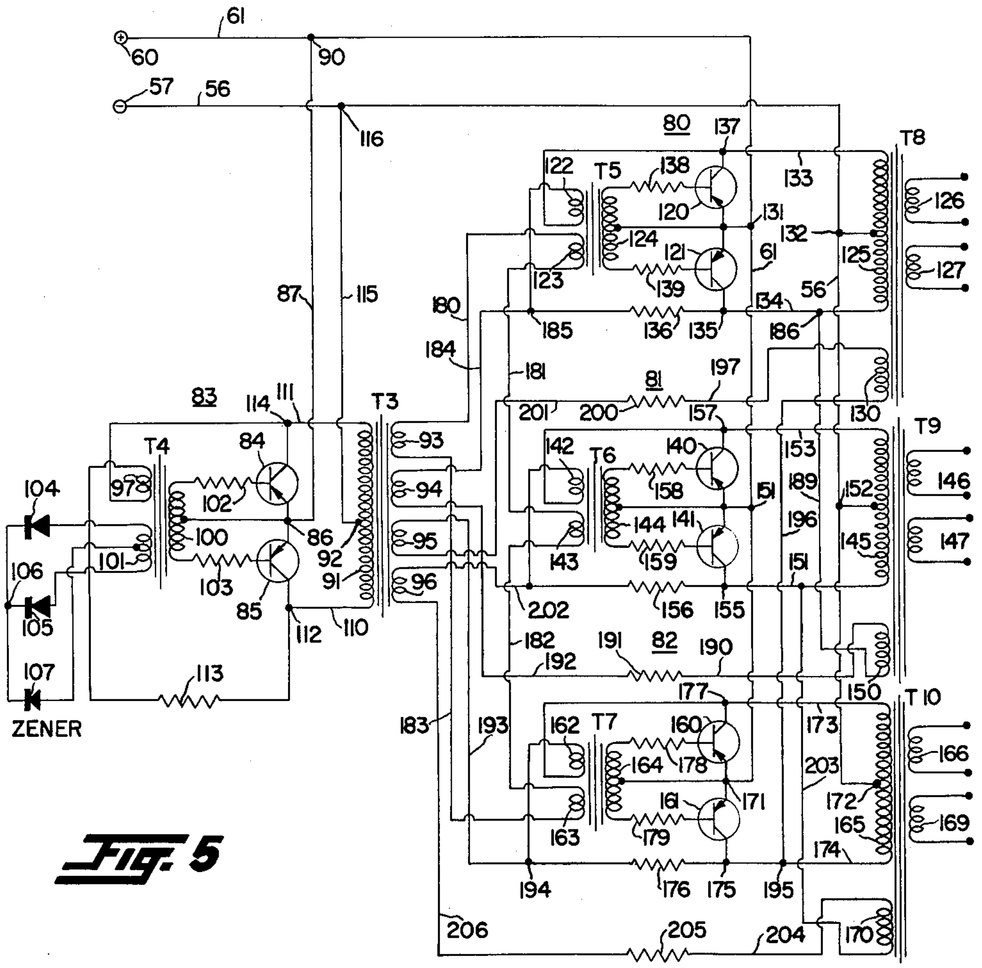
FIGURE 5 is a schematic diagram of another embodiment of the invention.

FIGURE 5 discloses three fundamental-frequency oscillators 80, 81 and 82 and a third-harmonic reference oscillator 83. The reference oscillator 83 includes a pair of junction transistors 84 and 85, each of these transistors having an emitter electrode, a collector electrode, and a base electrode. The emitter electrodes of transistors 84 and 85 are directly connected together at a junction 86. The junction 86 is connected by a conductor 87 to the positive supply conductor 61 at a junction 90 on the conductor 61, thus the emitter electrodes of the transistors 84 and 85 are connected directly to the positive supply terminal 60. The reference oscillator 83 also includes an output transformer T3 and a saturating feedback transformer T4. The output transformer T3 has a center-tapped primary winding 91, the winding 91 having an upper and a lower terminal and a center tap connection 92. The output transformer T3 also has secondary windings 93, 94, 95 and 96.

The saturating feedback transformer T4 has a primary winding 97, and has center-tapped secondary windings 100 and 101. The center-tap of the secondary winding 100 is directly connected to the junction 86 and thus to the emitter electrodes of transistors 84 and 85. The upper terminal of secondary winding 100 is connected by means of a resistor 102 to the base electrode of the transistor 84 and the lower terminal of the winding 100 is connected by means of a resistor 103 to the base electrode of transistor 85. The upper and lower terminals of secondary winding 101 are connected through rectifying diodes 104 and 105 respectively to a junction 106. The junction 106 is connected back to the center tap of winding 101 through a reference Zener diode 107.

The collector electrode of transistor 85 is connected by a conductor 110 to the lower terminal of primary winding 91 of transformer T3, and the collector electrode of transformer 84 is connected by a conductor 111 to the upper terminal of primary winding 91. A feedback path from the collector electrodes of transistors 84 and 85 can be traced from a junction 112 on the conductor 110 through a resistance 113 and the primary winding 97 of the saturating feedback transformer T4 to a junction 114 on the conductor 111. The center tap 92 of primary winding 91 of transformer T3 is directly connected by a conductor 115 to a junction 116 located on the negative supply conductor 56.

The first of the fundamental frequency oscillators 80 includes a pair of junction transistors 120 and 121, an output transformer T8 and a feedback transformer T5. The transistors 120 and 121 each have an emitter electrode, a collector electrode and a base electrode, and as disclosed in the drawing are connected in a common emitter configuration. The feedback transformer T5 has a primary winding 122, a tertiary winding 123, and a center tapped secondary winding 124. The output transformer T8 has a center-tapped primary winding 125 and secondary windings 126, 127 and 130. The emitter electrodes of the transistors 120 and 121 and the center tap of the secondary winding 124 of feedback transformer T5 are directly connected to a junction 131 on the positive supply conductor 61. The center-tap connection of the primary winding 125 of transformer T8 is directly connected to a junction 132 on the negative supply conductor 56. The upper and lower terminals of primary winding 125 are directly connected, respectively, by conductors 133 and 134 to the collector electrodes of transistors 120 and 121. A feedback path may be traced from a junction 135 on the conductor 134 through a resistor 136 and the primary winding 122 of transformer T5 to a junction 137 on the conductor 133. The upper terminal of secondary winding 124 of transformer T5 is connected through a resistor 138 to the base electrode of transistor 120 and the lower terminal of the winding is connected through a resistor 139 to the base electrode of transistor 121.

The second fundamental frequency oscillator 81 includes a pair of junction transistors 140 and 141, an output transformer T9 and a feedback transformer T6. Each of the transistors 140 and 141 has a collector electrode, an emitter electrode, and a base electrode. The feedback transformer T6 has a primary winding 142, a tertiary winding 143 and a center-tapped secondary winding 144. The output transformer T9 has a center-tapped primary winding 145 and secondary windings 146, 147 and 150. The emitter electrodes of the transistors 140 and 141 and the center-tap connection of the secondary winding 144 of transformer T6 are connected to a junction 151 on the positive supply conductor 61. The center-tap connection of the primary winding 145 of transformer T9 is directly connected to a junction 152 on the negative supply conductor 56. The upper and lower terminals of the primary winding 145 are connected by conductors 153 and 151 to the collector electrodes of transistors 140 and 141, respectively. A feedback path may be traced from a junction 155 located on the conductor 151, through a resistor 156 and the primary winding 142 of transformer T6 to a junction 157 located on the conductor 153. The upper and lower terminals of secondary winding 144 of transformer T6 are connected by resistors 158 and 159, respectively, to the base electrodes of the transistors 140 and 141.

The third fundamental frequency oscillator 82 includes a pair of junction transistors 160 and 161, an output transformer T10 and a feedback transformer T7. Each of the transistors 160 and 161 has a collector electrode, an emitter electrode and a base electrode. The feedback transformer T7 has a primary winding 162, a tertiary winding 163, and has a center-tapped secondary winding 164. Output transformer T10 has a center-tapped primary winding 165 and has secondary windings 166, 169 and 170. The emitter electrodes of the transistors 160 and 161 and the center-tap connection of the secondary winding 164 of transformer T7 are directly connected together and are connected to the positive supply conductor 61 at a junction 171. The center tap connection of the primary winding 165 of transformer T10 is directly connected to the negative supply conductor 56 at point 172. The upper and lower terminals of primary winding 165 are connected by conductors 173 and 174 to the collector electrodes of transistors 160 and 161, respectively. A feedback path from the output of transistors 160 and 161 may be traced from a junction 175 located on the conductor 174 through a resistor 176 and the primary winding 162 of feedback transformer T7, and then to a junction 177 located on the conductor 173. The upper and lower terminals of secondary winding 164 of feedback transformer T7 are connected by resistors 178 and 179 to the base electrodes of transistors 160 and 161, respectively.

The secondary winding 93 of third harmonic transformer T3 is coupled to the tertiary winding of each of the transformers T5, T6 and T7. A current path may be traced from the upper terminal of secondary winding 93 through a conductor 180, through the tertiary winding 123 of transformer T5, through a conductor 181, through the tertiary winding 143 of transformer T6, through a conductor 182, through the tertiary winding 163 of transformer T7 and through a conductor 183 back to the lower terminal of secondary winding 93. The secondary winding 94 of third harmonic transformer T3 is connected to the secondary winding 150 of transformer T9, and this current path may be traced from the upper terminal of winding 94 through a conductor 184, a junction 185, the resistor 136, the conductor 134 from a junction 186 on the conductor 134 through a conductor 189 to the lower terminal of secondary winding 150. The current path continues from the winding 150 through a conductor 190, a resistor 191 and a conductor 192 back to the lower terminal of secondary winding 94.

The secondary winding 95 of third harmonic transformer T3 is connected to the secondary winding 130 of transformer T8, and a current path may be traced from the upper terminal of winding 95 through a conductor 193, a junction 194, the resistor 176, the conductor 174 and from a junction 195 on conductor 174 through a conductor 196, the winding 130, a conductor 197, a resistor 200 and a conductor 201 back to the lower terminal winding 195. Similarly, the secondary winding 96 of third harmonic transformer T3 is connected to the secondary winding 170 of transformer T10, and a current path may be traced from the upper terminal of winding 96 through a conductor 202, the resistor 156, the conductor 151, a conductor 203, through the secondary winding 170, a conductor 204, a resistor 205, and back through a conductor 206 to the lower terminal of secondary winding 96.

OPERATION OF FIGURE 5

The circuit of FIGURE 5 produces three substantially square-wave voltages spaced one-third of a cycle apart, at output transformers T8, T9 and T10. Each of the transistors disclosed in FIGURE 5 is operated as a switch in the preferred embodiment. The circuit is designed so that the alternating current voltage impressed on transformer T3 from the reference oscillator 83, is a third harmonic of the operating frequency of each of the oscillators 80, 81 and 82. In the explanation to follow, let it be assumed that the desired result is to produce a three-phase square-wave 400 c.p.s. output potential.

The third harmonic reference oscillator 83 which comprises the transformer T3, the transformer T4, the transistors 84 and 85 and the associated circuitry, is designed to operate at 1200 c.p.s. The 1200 c.p.s. square-wave output of this oscillator is of a relatively constant frequency independent of the D.C. supply voltage, leading of the oscillator and other conditions. In operation, the transistors 84 and 85 are operated as switches and are alternately and oppositely rendered conductive and nonconductive. Considering now the period during which transistor 84 is conductive, a current path may be traced from the positive supply conductor 60 through the conductors 61 and 87, through the transistor 84 from emitter to collector, through conductor 111 to the upper terminal of primary winding 91 of transformer T3, through the upper portion of winding 91 to the center tap connection 92, and back through the conductors 115 and 56 to the negative supply terminal 57. During this period the positive voltage wave form induced in transformer T3, as shown in portion *j* of curve *a* of FIGURE 6. A positive feedback circuit is provided from the collector electrode of transistor 84 through the primary winding 97 of feedback transformer T4 and the resistor 113 to the collector electrode of the transistor 85. The induced potential in the secondary winding 100 of the transformer T4 is in a direction to maintain the transistor 84 conducting and to maintain transistor 85 cut off. Transistor 84 will be maintained conductive until the loop gain of the circuit becomes less than unity, this occurring upon saturation of the core material of feedback transformer T4. When the core of feedback transformer T4 saturates, the increased magnetizing current demanded by the transformer results in a larger voltage drop across the feedback resistor 113, reducing the drive voltage to the transistor. When the drive is insufficient to hold the transistor conductive in the presence of its collector load, degeneration results and the transistor becomes non-conductive. Energy stored in the transformers T3 and T4 causes reversal of the oscillator 83 and the transistor 85 becomes conductive. Current now flows through a path which can be traced from the positive supply conductor 60 through the conductors 61 and 87, through transistor 85 from emitter to collector, up through the lower portion of primary winding 91 of transformer T3 and back through conductors 115 and 56 to the negative supply terminal 57. The potentials now induced in the windings of transformer T3 are negative and are shown as portion *k* of curve *a* of FIGURE 6. This condition exists until the feedback transformer T4 saturates in the opposite direction, then the cycle repeats. The frequency of operation is proportional to the rate of change of flux in the feedback transformer T4 or is proportional to the induced voltage in a winding of this transformer. By controlling the induced voltage in a winding of the feedback transformer T4, the frequency may be controlled. The square-wave voltage induced in the winding 101 of transformer T4 is rectified by the diodes 104 and 105 and is clipped by the reference Zener diode 107. This circuit causes the induced voltage in feedback transformer T4 to be constant and thereby hold the oscillator frequency constant. This frequency stabilizing circuit is discussed in greater detail in my co-pending application entitled "Semiconductor Apparatus," Serial No. 625,376, filed November 30, 1956, now Patent No. 2,997,664, and assigned to the same assignee as the present invention.

Figure 6:
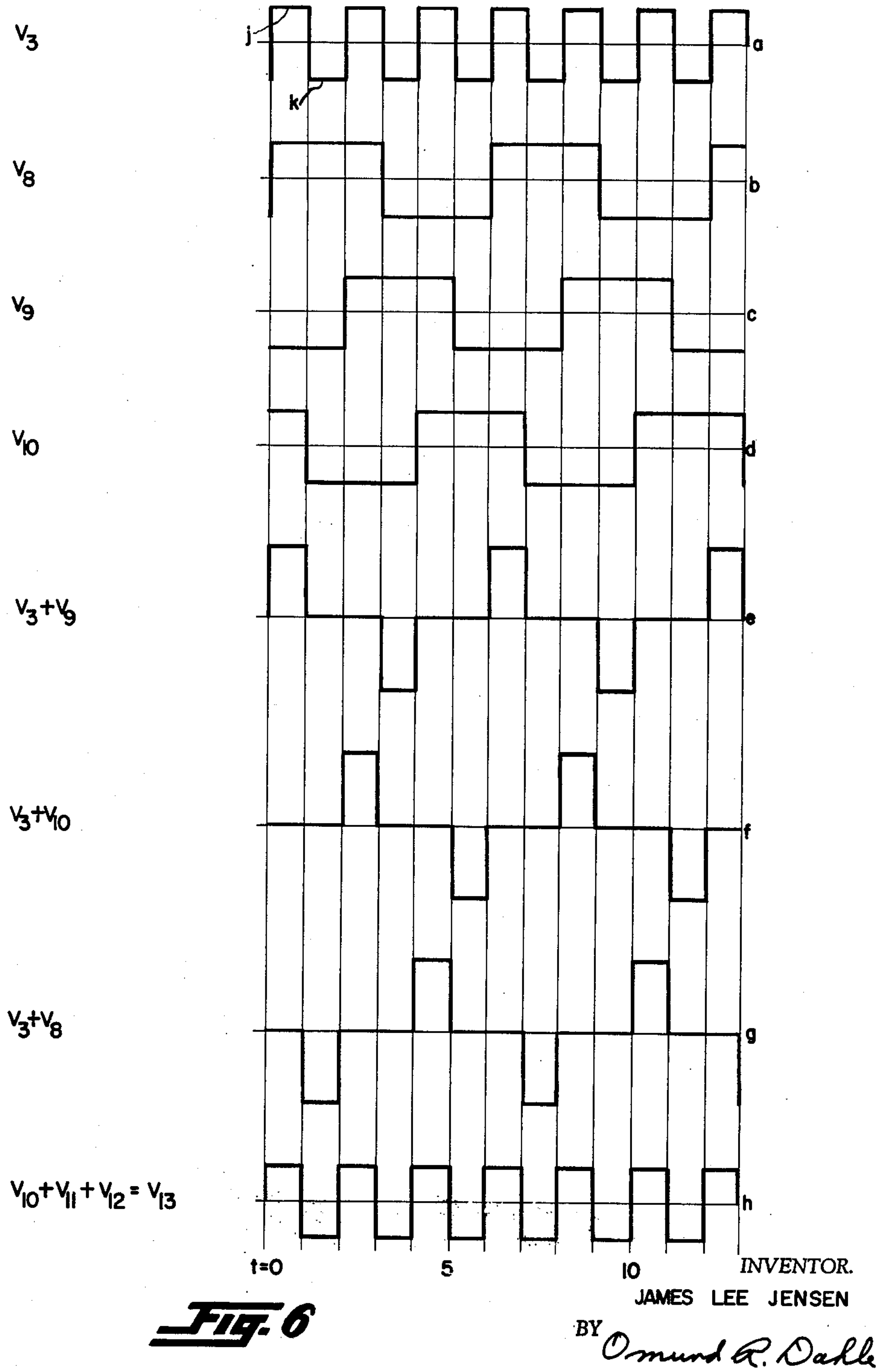
FIGURE 6 shows the general configuration of the wave forms of the circuit of FIGURE 5.

The oscillators 80, 81 and 82, which provide a three phase 400 cycle output, are preferably designed to operate at a natural frequency of somewhat less than 400 c.p.s. The square-wave output potentials of transformers T8, T9 and T10 are shown in curves *b*, *c* and *d* of FIGURE 6. The output of the reference oscillator 83 is combined with the output potentials of the power oscillators 80, 81 and 82 to produce the 400 cycle three phase square-wave output with the proper phase separation and sequence. The curves *e*, *f* and *g* of FIGURE 6 are the wave forms of the synchronizing potentials applied to the feedback transformers T5, T6 and T7, respectively, of the oscillators 80, 81 and 82. Referring to the wave form in FIGURE 6, consider the period $T=0$ and by summing of the voltage V9 on winding 150 of oscillator 81, shown as the curve *c* of FIGURE 6, and the potential V3 on winding 94, the voltage pulse $V3+V9$ results, shown in curve *e* of FIGURE 6. This potential is applied across the resistor 136 in the feedback circuit of oscillator 80, in a polarity direction to aid in switching the oscillator 80 from a state with transistor 121 conducting to a state with transistor 120 conducting. This change in polarity of output V8 of oscillator 80 is shown in the curve *b*, FIGURE 6, at time $T=0$. It can be seen from curves *f* and *g* that no other synchronizing pulses appear at this instant of time.

Considering now the wave forms of FIGURE 6, at time $T=1$, it will be noted that the sum of potentials $V3+V9$ and $V3+V10$ result in no synchronizing potentials but that the sum of the potential $V3+V8$ from oscillator 80 results in a negative pulse which appears across the feedback resistor 176 of oscillator 82 which is in a direction to aid in the switching of the oscillator 82 so that transistor 161 is rendered conductive and transistor 160 becomes non-conductive. The resultant polarity change at the output transformer T10 of oscillator 82 is shown in curve *d* of FIGURE 6.

At time $T=2$ it will be noted that the summation of the potential induced on transformer T10 of oscillator 82 and the third harmonic transformer T3 results in a positive synchronizing pulse $V3+V10$ which is applied across the resistor 156 to aid in the switching of transistors 140 and 141 of oscillator 81 whereby transistor 140 is rendered conductive. In the similar manner, by comparing the wave forms of FIGURE 6 during each successive period of time, it can be seen that each oscillator is linked to another oscillator output and to the third harmonic transformer. The transformer connections are made to the feedback circuits such that the proper phase sequence and frequency are maintained with phase separation of one-third of a cycle, between the three power oscillators.

The purpose of winding 93 and the tertiary windings of transformers T5, T6 and T7 is to insure the proper sequence of switching between the oscillators 80, 81 and 82. Two separate synchronizing circuits operate in harmony in each of the oscillators, the first synchronizing signal of oscillator 80 arising from the sum of potentials on winding 94 and winding 150, the second synchronizing signal being the series circuit including the windings 93, 123, 143 and 163. The potential wave form of this second synchronizing signal is shown in curve *h* of FIGURE 6. Each of the oscillators similarly has two synchronizing signals. If the proper sequence is not initially obtained the combination of the two synchronizing circuits will cause reversal of one or more of the oscillators until the proper sequence and phase displacement is obtained.

Many changes and modifications of this invention will undoubtedly occur to those who are skilled in the art and I therefore wish it to be understood that I intend to be limited by the scope of the appended claims and not by the specific embodiment of my invention which is disclosed herein for the purpose of illustration only.

I claim:

1. Inverter apparatus for converting direct current power of a given frequency to three-phase alternating power comprising; a source of direct current power having a first and a second terminal; first, second and third pairs of semiconductor switching means, each of said semiconductor switching means having a plurality of electrodes including switching and control electrodes; first, second and third transformer means, said transformer means having primary windings energizable to produce magneto motive forces acting in opposing directions in said transformer means, said primary winding means being connected for energization from said direct current source through separate paths for effecting opposing energization of said transformer means to provide an alternating output from each of said transformer means, the switching electrodes of said first pair of semiconductor switching means being included in said separate paths, respectively, of said first transformer means, the switching electrodes of said second pair of semiconductor switching means being connected in the separate paths, respectively, of the second transformer means, and the switching electrodes of said third pair of semiconductor switching means being connected in said separate paths of the third transformer means; means producing a potential, the frequency of which is triple said given frequency, said means having output circuits connected to the control electrodes of said semiconductor switching means in current controlling relation thereto; and feedback windings on said first, second and third transformer means and connected in circuit with the output of said triple frequency potential producing means for modifying the output control voltages of said triple frequency potential producing means to selectively cause switching of said semiconductor switching means to maintain a phase separation in the output circuits of said first, second, and third transformer means to thereby provide a three phase output potential of said given frequency.

2. Inverter apparatus for converting direct current power of a given frequency to three-phase alternating power comprising; a source of direct current power having a first and a second terminal; a plurality of transistors, each of said transistors having a plurality of electrodes including switching and control electrodes said transistors each being operable from a non-conductive state to a fully conductive state by a suitable control potential; first, second and third transformer means, said transformer means having primary windings capable of being energized to produce magneto motive forces acting in opposing directions in said transformer means, each of said primary winding means being connected for energization from the first terminal of said direct current source through a pair of separate paths for effecting opposing energization of each of said transformer means, the switching electrodes of first and second transistors of said plurality being included in the separate paths, respectively, connected to said first transformer means, the switching electrodes of third and fourth transistors of said plurality being connected in the separate paths, respectively, connected to the second transformer means, and the switching electrodes of fifth and sixth transistors of said plurality being connected in the separate paths connected to the third transformer means and circuit completing means connecting each of said primary windings to said second terminal of said direct current source whereby said transistors and said transformers are energized, regenerative feedback means connected from said separate paths to the control electrodes of the associated transistors, respectively, whereby one or the other of the paths associated with each transformer means is maintained conductive; third harmonic reference frequency producing means having output circuits for providing output potentials, said output circuits connected to the control electrodes of said transistors in current controlling relation thereto; and feedback means associated with said first, second and third transformer means and connected in circuit with the output circuits of said third harmonic reference frequency producing means for modifying the output control voltages of said third harmonic reference frequency producing means to selectively cause switching of said transistors from one state to the other to maintain a phase separation in the alternating output potentials of said first, second and third transformer means whereby a three phase output of said given frequency is produced.

3. Inverter apparatus for converting direct current power to three-phase alternating power comprising: a source of direct current power having a first and a second terminal; a plurality of semiconductor switching means, each of said semiconductor switching means having a plurality of electrodes including a collector, an emitter, and a control electrode, the emitter of each of said semiconductor switching means being connected to said first terminal; first, second, and third transformer means, each of said transformer means having a plurality of windings including at least a primary winding and a secondary winding; first, second and third fundamental frequency oscillator circuits energized from said direct current source of power, each of said oscillator circuits comprising a pair of said semiconductor switching means and one of said transformer means, the collector electrodes of said pair of semiconductor switching means being connected to the second source terminal through a separate portion of the primary winding of the associated transformer means, said oscillator circuits further comprising inductive feedback means connected to said collector electrodes and to said control electrodes to provide regenerative feedback thereto; third harmonic reference frequency oscillator means having a plurality of output circuits connected in controlling relation to the control electrodes of said semiconductor switching means for providing switching potentials to the control electrodes to switch said semiconductor means from a non-conductive to a conductive condition; and phase separating inductance potential producing means connected to said transformer means and to said third harmonic oscillator means for modifying the control potential from said third harmonic oscillator means so that phase separation is maintained between said first, second, and third oscillatory circuits to thereby provide a three-phase alternating output potential.

4. Inverter apparatus for converting direct current power to three phase alternating power comprising: first and second power input terminals energizable from a source of direct current potential; first, second and third transformers, each of said transformers having first and second primary windings, a feedback winding and an output winding; three pair of normally non-conductive semiconductor switching means, each of said semiconductor switching means having a plurality of electrodes including a collector electrode, an emitter electrode and a control electrode; means directly connecting the collector electrodes of said first pair of semiconductor switching means to the first terminals of the primary windings of said first transformer; the second terminal of said primary windings being connected to the first power source terminal; means directly connecting the emitter electrodes of each of the semiconductor switching means to said second power source terminal; means connecting the collector electrode of said second and third pair of semiconductor switching means, respectively, to the first terminals of the primary windings of said second and third transformers; first, second and third feedback transformer means associated with said first, second and third pair of semiconductor switching means, each of said feedback transformer means having a plurality of windings including a primary winding and secondary windings; means connecting the collector electrodes of said first, second and third pair of semiconductor switching means, respectively, to the primary windings of said first, second and third feedback transformer means; means connecting a secondary winding of each of said feedback transformers to the control electrodes of the associated pair of semiconductor switching means, whereby a regenerative feedback loop is established from the output to the input of each of said pair of semiconductor switching means to provide three fundamental frequency oscillator circuits; third harmonic potential producing means for providing a plurality of third harmonic output potentials; means for connecting an output of said third harmonic potential producing means and the feedback winding from said second transformer to the feedback circuit of said first pair of semiconductor switching means; means for connecting an output of said third harmonic potential producing means and the feedback winding of said third transformer to the feedback circuit of said second pair of semiconductor switching means; and means for connecting an output of said third harmonic potential producing means and the feedback winding of said first transformer to the feedback circuit of said third pair of semiconductor switching means whereby phase separation is maintained between said first, second and third oscillator circuits to thereby provide a three-phase alternating output potential on said output windings.

5. A three-phase wave generator comprising means for generating a control signal varying periodically between a first and a second level at a predetermined repetition rate, first, second and third multistable devices, each of the devices including an input and an output circuit and being adapted to assume first and second states of operation in response to the application of signals to the input circuit thereof having first and second predetermined levels respectively, means responsive to the control signal and to the state of the third multistable device for applying a signal of the first predetermined level to the input circuit first multistable device when the control signal is at its first level and the third device is in its second state and for applying a signal of the second predetermined level to the input circuit of the first device when the control signal is at its second level and the third device is in its first state, means responsive to the control signal and to the state of the first multistable device for applying a signal of the first predetermined level to the input circuit of the second multistable device when the control signal is at its first level and the first device is in its second state and for applying a signal of a second predetermined level to the input circuit of the second device when the control signal is at its second level and the third device is in its first state, means responsive to the control signal and to the state of the second multistable device for applying a signal of the first predetermined level to the input circuit of the third multistable device when the control signal is at its first level and the third device is in its second state, and for applying a signal of the second predetermined level to the input circuit of the first device when the control signal is at its second level and the second device is in its first state; and means coupled to the output circuits of each of the multistable devices for deriving a three-phase output signal from the devices.

6. A three-phase wave generator comprising a source of substantially square wave signals, first, second and third multivibrators, each of the multivibrators including an input and an output circuit, first, second, and third summing circuits, each of the summing circuits having a pair of input circuits and an output circuit, one input circuit of each of the summing circuits being connected to the source of square wave signals, the other input circuit of the first, second and third summing circuits being connected to the output circuits of the third, first and second multivibrators, respectively, the output circuits of the first, second and third summing circuits being connected to the input circuit of the first, second and third multivibrators respectively, each of the summing circuits being adapted to establish a signal in the output circuit thereof that is proportional to the sum of the signals applied to the input circuits thereof.

7. A three-phase wave generator as defined in claim 6 wherein each of the multivibrators includes a pair of transistors, each of the transistors including base, emitter, and collector electrodes, the output circuit of each of the multivibrators being connected to the collector electrodes of the transistors of the multivibrator, the input circuits of each of the multivibrators being connected to the base electrodes of the transistors of the multivibrator, the emitter electrodes of the transistors of each multivibrator being connected together, whereby a signal developed across the input circuit to each multivibrator will be coupled in one phase relationship to the base and emitter electrodes of one of the transistors of the multivibrator and in an opposite phase relationship to the base and emitter electrodes of the other transistor of the multivibrator.

8. A three-phase wave generator comprising a square wave generator for producing substantially square wave signals of a predetermined frequency and varying between positive and negative levels with respect to a preselected reference level; first, second, and third multivibrators, each of the multivibrators including an input and an output circuit and having first and second states of operation of at least temporary stability for the time interval of one and a half cycles of the square wave, each of the multivibrators being arranged to produce substantially rectangular positive and negative signals in the output circuit thereof with respect to the reference level when in the first and second states of operation, respectively; each of the multivibrators being further arranged to change from the first to the second state of operation in response to the application to the input circuit thereof of a positive signal with respect to the reference level, and to change from the second to the first state of operation in response to the application to the input circuits thereof of a negative signal with respect to the reference level; first, second and third summing circuits, each of the summing circuits having a pair of input circuits and an output circuit and being adapted to produce a signal in the output circuit thereof that is proportional to the algebraic sum of the signals applied to the input circuits thereof, means connecting the square wave generator to one of the input circuits of each of the summing circuits, means connecting the other input circuit of the first, second and third summing circuits to the output circuits of the third, first and second multivibrators, respectively, whereby the multivibrators are caused to change their states of operation in sequence to produce a three-phase signal, and means connected to each of the output circuits of the multivibrators for deriving the three-phase signal therefrom.

9. A three-phase wave generator as defined in claim 8 wherein each of the multivibrators includes a pair of semiconductor devices, and each of the summing circuits includes a pair of inductors connected in series relationship.

10. A three-phase wave generator comprising first, second, and third multivibrators, each of the multivibrators including a pair of transistors and having first and second discrete states of operation, one of the transistors of each multivibrator being adapted to conduct during the first state of operation and the other transistor of each multivibrator being adapted to conduct during the second state of operation, each of the multivibrators including an output circuit connected across the collector electrodes of the transistors thereof; means for causing one transistor of each multivibrator to conduct initially, first, second and third summing networks, each of the summing networks having a pair of input circuits and an output circuit and adapted to establish a signal across the output circuit that is a measure of the algebraic sum of the signals applied across the input circuits, circuit means coupling one of the input circuits of the first, second and third summing networks to the output circuit of the first, second and third multivibrators, respectively; circuit means coupling the output circuit of the first, second, and third summing networks across the base and emitter electrodes of each of the transistors of the second, third, and first multivibrators, respectively, and means for applying substantially square wave signals having a predetermined frequency to the other input circuit of each of the summing networks.

11. In an inverter for converting a direct current energizing potential to a three-phase voltage the combination comprising first, second, third and fourth transformers, each of the transformers including at least one primary winding, the first transformer including first, second and third secondary windings, the second, third, and fourth transformers including fourth, fifth and sixth secondary windings, respectively; first, second and third multivibrators, each of the multivibrators including an input circuit and an output circuit and being adapted to assume first and second states of operation, the output circuit of the first, second and third multivibrators being coupled to the primary winding of the second, third and fourth transformers, respectively; a source of direct current energizing potential, means coupling the source to the output circuits of each of the multivibrators, the first and fourth secondary windings being connected in series relationship across the input circuit of the second multivibrator, the second and fifth secondary windings being connected in series relationship across the input circuit of the third multivibrator, the third and sixth secondary windings being connected in series relationship across the input circuit of the first multivibrator; means for applying substantially square wave signals to the primary winding of the first transformer and means coupled to the second, third and fourth transformers for deriving output signals therefrom.

12. The combination as defined in claim 11 wherein each of the multivibrators is adapted to assume the first and second states of operation, respectively, in response to the application of positive and negative signals of a predetermined amplitude to the input circuit thereof and each of the multivibrators is arranged to establish positive and negative signals across the output circuit thereof when in the first and second states of operation respectively, and wherein the square wave signals applied to the primary winding of the first transformer vary between positive and negative levels, the absolute amplitude of the positive and negative levels of the square wave signal being substantially equal to the absolute amplitude of the signals established in the secondary windings of the second, third and fourth transformers.

13. The combination as defined in claim 11 including means for controlling the states of operation of each multivibrator when the direct current source is initially coupled to the multivibrators.

14. A wave generator for providing phase displaced waves including a preselected plurality of cascaded wave generating elements switchable between two conductive conditions and arranged in a closed circuit, a source of control pulses, and circuit means coupled to be responsive to the control pulses and signals representative of the conductive condition of a preceding element whereby the combination of same are effective to control the conductive condition of a succeeding element to thereby switch said elements in a time sequence to provide output waves having a phase relationship corresponding to the preselected number of plurality of said elements.

15. A wave generator for providing phase displaced waves as defined in claim 14 wherein said source of control pulses is a wave generating element switchable at a preselected rate higher than the switching rate of said cascaded wave generating elements, said rate determined by the number of phases for said output waves.

16. A three phase wave generator including three wave generating elements switchable between two conductive conditions and arranged in a ring circuit, a source of control pulses, and circuit means coupled to be responsive to the control pulses and to the conductive condition of a preceding element whereby preselected combinations of same render the succeeding elements conductive and nonconductive to thereby control the switching rate of said three elements to provide output waves therefrom having a three phase relationship.

17. A three phase wave generator including three wave generating elements switchable between two conductive conditions and arranged in a ring circuit, a source of control pulses, and summing circuit means coupled to be responsive to the control pulses and to the conductive condition of a preceding element whereby the sum of same control the switching rate of the succeeding element, said source of control pulses having a pulse repetition rate effective to switch said three elements at a submultiple of the repetition rate of said control pulses to have a three phase relationship.

18. A three phase wave generator as defined in claim 17 wherein said summing circuit means comprises an individual summing circuit coupled intermediate said source of control pulses and a pair of successive wave generating elements.

References Cited in the file of this patent

UNITED STATES PATENTS

| | | |
|---|---|---|
| 1,904,455 | Hazeltine | Apr. 18, 1933 |
| 2,774,878 | Jensen | Dec. 18, 1956 |
| 2,824,274 | Holt | Feb. 18, 1958 |